(12) United States Patent
Kubo et al.

(10) Patent No.: US 9,038,763 B2
(45) Date of Patent: May 26, 2015

(54) HYDRAULIC POWER STEERING SYSTEM

(75) Inventors: Ryouichi Kubo, Kashihara (JP);
Yasuhiro Tomagou, Yao (JP); Akihiko Shiina, Kashihara (JP); Masahiko Sakamaki, Yao (JP); Tetsuya Ozaki, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 592 days.

(21) Appl. No.: 13/273,866

(22) Filed: Oct. 14, 2011

(65) Prior Publication Data

US 2012/0097472 A1    Apr. 26, 2012

(30) Foreign Application Priority Data

Oct. 22, 2010 (JP) ................. 2010-237427

(51) Int. Cl.
| | | |
|---|---|---|
| B62D 5/065 | (2006.01) | |
| B62D 5/06 | (2006.01) | |
| B62D 5/09 | (2006.01) | |
| B62D 15/02 | (2006.01) | |

(52) U.S. Cl.
CPC ............... *B62D 5/065* (2013.01); *B62D 5/064* (2013.01); *B62D 5/09* (2013.01); *B62D 15/027* (2013.01)

(58) Field of Classification Search
CPC ............ B62D 5/09; B62D 5/30; B62D 5/065; B62D 6/00; B62D 5/064
USPC ......... 180/441, 442, 421, 422, 423, 168, 189, 180/204, 180; 701/23, 41, 301
See application file for complete search history.

(56) References Cited

U.S. PATENT DOCUMENTS

| | | | | |
|---|---|---|---|---|
| 8,340,866 | B2 * | 12/2012 | Hanzawa et al. | 701/41 |
| 8,599,043 | B2 * | 12/2013 | Kadowaki et al. | 340/932.2 |
| 2005/0051378 | A1 * | 3/2005 | Merz | 180/441 |
| 2006/0086557 | A1 * | 4/2006 | Phillips | 180/441 |
| 2006/0237256 | A1 | 10/2006 | Sasaki et al. | |
| 2008/0308341 | A1 * | 12/2008 | Linkenbach et al. | 180/441 |
| 2008/0312794 | A1 | 12/2008 | Roth | |
| 2009/0194361 | A1 * | 8/2009 | Eisenbarth | 180/422 |

FOREIGN PATENT DOCUMENTS

| | | |
|---|---|---|
| DE | 10 2007 027 948 A1 | 12/2008 |
| DE | 10 2008 035 793 A1 | 2/2010 |
| EP | 1 652 751 A2 | 5/2006 |
| JP | A-2006-123580 | 5/2006 |
| JP | A-2006-290151 | 10/2006 |
| JP | A-2006-306239 | 11/2006 |
| WO | WO 2006/069922 A2 | 7/2006 |

OTHER PUBLICATIONS

Extended Search Report issued in European Patent Application No. 11185864.3 dated Jun. 25, 2013.

* cited by examiner

*Primary Examiner* — Anne Marie Boehler
(74) *Attorney, Agent, or Firm* — Oliff PLC (57) ABSTRACT

A hydraulic power steering system includes: a hydraulic cylinder in which an interior is partitioned into first and second hydraulic chambers by a piston on a steered shaft; a variable displacement electric pump that supplies hydraulic fluid to the hydraulic cylinder; a selector valve selectively set in a mode in which the hydraulic fluid is supplied to the first hydraulic chamber and drained from the second hydraulic chamber or in a mode in which the hydraulic fluid is supplied to the second hydraulic chamber and drained from the first hydraulic chamber; a detector that detects torque, steering angle, and/or vehicle speed; and a controller.

12 Claims, 7 Drawing Sheets

HYDRAULIC POWER STEERING SYSTEM

INCORPORATION BY REFERENCE

The disclosure of Japanese Patent Application No. 2010-237427 filed on Oct. 22, 2010 including the specification, drawings and abstract, is incorporated herein by reference in its entirety.

BACKGROUND OF THE INVENTION

1. Field of the Invention

The invention relates to a hydraulic power steering system that assists an operation for steering a vehicle using a force produced by a hydraulic cylinder.

2. Description of Related Art

A hydraulic power steering system that assists an operation for steering a vehicle using a hydraulic cylinder includes a selector valve that is used to control the manner in which a hydraulic fluid is supplied to the hydraulic cylinder and drained from the hydraulic cylinder, in accordance with the amount of steering torque transmitted from a steering shaft to a steered shaft via a rack and pinion mechanism (for example, refer to Japanese Patent Application Publication No. 2006-123580).

How the manner in which the hydraulic fluid is supplied to and drained from the hydraulic cylinder should be controlled by the selector valve is determined based on the relative phase difference between a shaft fixed to the steering shaft and a rotary valve connected to the shaft via a torsion bar, that is, the torsion amount of the torsion bar.

With the conventional hydraulic power steering system structured as described above, the driver's steering operation is appropriately assisted. However, the assist force, that is, the manner in which the hydraulic fluid is supplied to and drained from the hydraulic cylinder is determined based simply on the torsional torque of the steering shaft. Therefore the assist force cannot be flexibly changed to meet various requirements based on other vehicle operation states. Accordingly, such a conventional hydraulic power steering system has room for improvement in changing the assist force that is produced by the hydraulic cylinder flexibly enough to meet various requirements.

SUMMARY OF THE INVENTION

It is an object of the invention to provide a hydraulic power steering system that achieves highly flexible control of the assist force that is produced by a hydraulic cylinder.

An aspect of the invention relates to a hydraulic power steering system that includes: a hydraulic cylinder in which an interior is partitioned into a first hydraulic chamber and a second hydraulic chamber by a piston provided on a steered shaft; and a variable displacement electric pump that supplies a hydraulic fluid to the hydraulic cylinder. The hydraulic power steering system assists a steering operation for steering a vehicle by moving the steered shaft together with the piston using a force produced due to a difference between a hydraulic pressure in the first hydraulic chamber and a hydraulic pressure in the second hydraulic chamber. The hydraulic power steering system further includes a selector valve, a detector, and a controller. The selector valve is selectively set in an operation mode in which the hydraulic fluid is supplied to the first hydraulic chamber while the hydraulic fluid is drained from the second hydraulic chamber or in an operation mode in which the hydraulic fluid is supplied to the second hydraulic chamber while the hydraulic fluid is drained from the first hydraulic chamber. The detector detects an operation state of the vehicle. The controller sets, based on the operation state detected by the detector, a fluid supply-drain manner in which the hydraulic fluid is supplied to and drained from the hydraulic cylinder, and controls the operation mode of the selector valve and an amount of hydraulic fluid that is supplied from the electric pump based on the set fluid supply-drain manner.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 8A to 8C are views showing the structures of a selector valve, a hydraulic cylinder and a drain valve of a hydraulic power steering system according to a third example embodiment of the invention, wherein

DETAILED DESCRIPTION OF EMBODIMENTS

Figure 1:
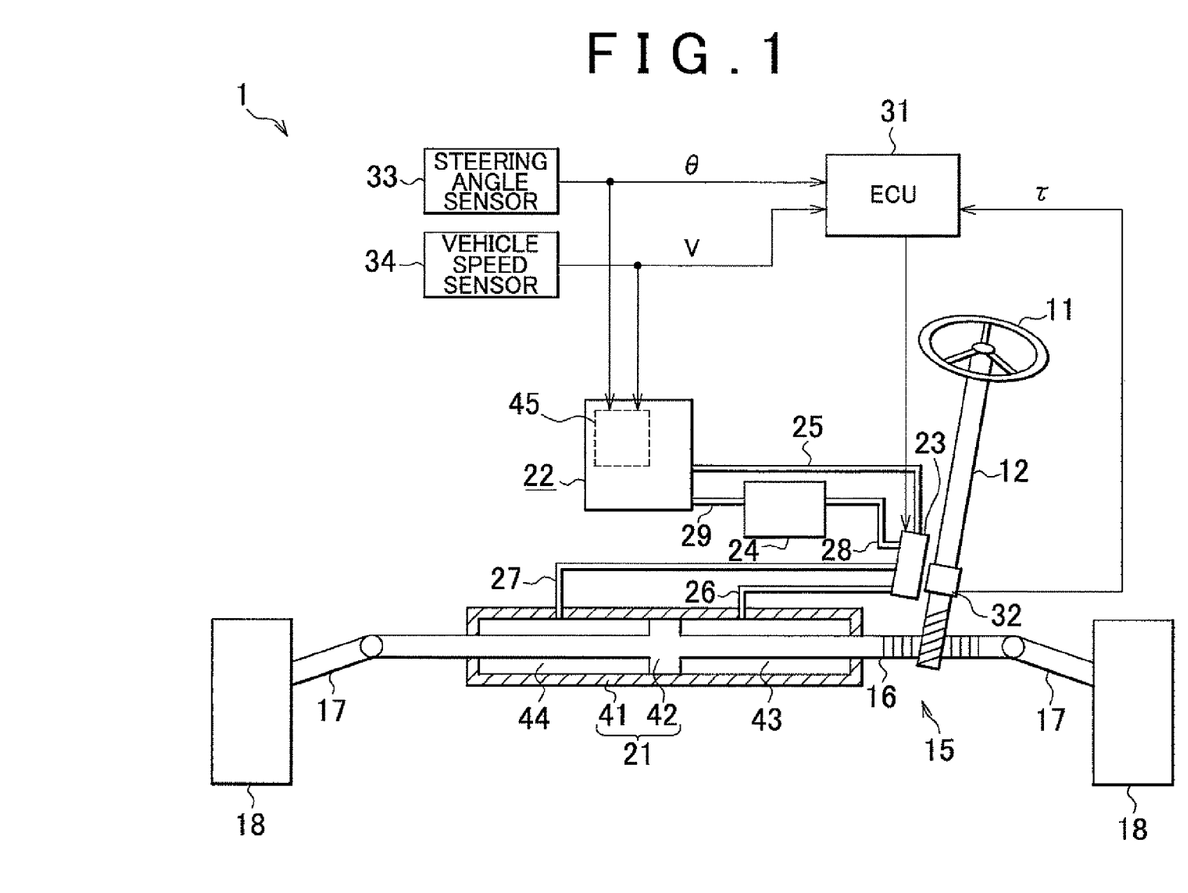
FIG. 1 is a view schematically showing the overall structure of a hydraulic power steering system according to a first example embodiment of the invention.

A first example embodiment of the invention will be described with reference to FIGS. 1 to 3. As shown in FIG. 1, a hydraulic power steering system 1 has a steering wheel 11 and a steering shaft 12 that are fixed to each other. The steering shaft 12 and a steered shaft 16 are connected to each other via a rack and pinion mechanism 15 constituted of a pinion formed at the steering shaft 12 and a rack formed at the steered shaft 16. The rotation of the steering shaft 12 caused by a steering operation is converted into a linear reciprocating motion of the steered shaft 16 by the rack and pinion mechanism 15. The linear reciprocating motion of the steered shaft 16, caused by the rotation of the steering shaft 12, is transferred to knuckles (not shown in the drawings) via respective tie rods 17 that are connected to the respective ends of the steered shaft 16. As a result, the steered angle of steered wheels 18 is changed.

The hydraulic power steering system 1 includes a hydraulic cylinder 21, a variable displacement electric pump 22, a selector valve 23, and a reservoir tank 24, which constitute a steering operation assist mechanism. The hydraulic cylinder 21 is fixed to the steered shaft 16. The variable displacement electric pump 22 supplies a hydraulic fluid to the hydraulic cylinder 21. The selector valve 23 is used to control the manner in which the hydraulic fluid is supplied to and drained from the hydraulic cylinder 21. The reservoir tank 24 stores the hydraulic fluid drained from the selector valve 23.

The hydraulic cylinder 21, the electric pump 22, the selector valve 23, and the reservoir tank 24 are interconnected via a first fluid passage 25, a second fluid passage 26, a third fluid passage 27, a fourth fluid passage 28, and a fifth fluid passage 29. More specifically, the electric pump 22 and the selector valve 23 are connected to each other via the first fluid passage 25. The selector valve 23 and the hydraulic cylinder 21 are connected to each other via the second fluid passage 26 and the third fluid passage 27. The hydraulic cylinder 21 and the reservoir tank 24 are connected to each other via the fourth fluid passage 28. The reservoir tank 24 and the electric pump 22 are connected to each other via the fifth fluid passage 29.

The steered shaft 16 passes through a housing 41 serving as a casing of the hydraulic cylinder 21. A piston 42 is provided at the steered shaft 16. Formed within the housing 41 are a first hydraulic chamber 43 and a second hydraulic chamber 44, which are separated from each other by the piston 42. The second fluid passage 26 is connected to the first hydraulic chamber 43, and the third fluid passage 27 is connected to the second hydraulic chamber 44.

The electric pump 22 incorporates, as its power source, a three-phase coil brushless motor (will hereinafter be referred to as "motor 45") that rotates only in one direction. Further, the electric pump 22 incorporates an impeller (not shown in the drawings) that is coupled with an output shaft of the motor 45. As the motor 45 rotates, the impeller rotates. As a result, the hydraulic fluid is drawn up from the reservoir tank 24 via the fifth fluid passage 29, and then discharged toward the selector valve 23 via the first fluid passage 25.

An electronic control unit (will hereinafter be referred to as "ECU 31"), which is an example of "controller", controls the electric pump 22 and the selector valve 23. More specifically, a torque sensor 32, a steering angle sensor 33, and a vehicle speed sensor 34, each of which is an example of "detector", are electrically connected to the ECU 31, and the ECU 31 detects a steering torque τ, a steering angle θ, and a vehicle speed V, each of which is an example of "an operation state of a vehicle", based on the signals output from these sensors.

Next, the configuration of a control executed by the hydraulic power steering system 1 will be described with reference to FIG. 2. The ECU 31 includes an assist force calculation portion 51 that calculates an assist force command value TA specifying the assist direction and assist force level, based on the steering torque τ calculated from the signals output from the torque sensor 32, the steering angle θ calculated from the signals output from the steering angle sensor 33, and the vehicle speed V calculated from the signals output from the vehicle speed sensor 34. The ECU 31 controls the manner in which the hydraulic fluid is supplied to and drained from the hydraulic cylinder 21, which is achieved by the selector valve 23, and a discharge pressure P of the electric pump 22, based on the assist force command value TA calculated by the assist force calculation portion 51.

More specifically, the assist force command value TA is input into a flowrate control portion 52, and then the flowrate control portion 52 converts the assist force command value TA into a flowrate command value QA, which is a target flowrate of the hydraulic fluid that is supplied to the hydraulic chamber. Then, the flowrate command value QA is input into a current calculation portion 53. Meanwhile, an actual current IR detected by a current detection portion 54 that detects the current at the motor 45 and an actual rotation angle SR detected by a rotation angle detection portion 55 that detects the rotation angle of the motor 45 are input into the current calculation portion 53. The current calculation portion 53 generates a motor control signal based on the flowrate command value QA and through current feedback control on the actual current IR and the actual rotation angle SR, and then outputs the generated motor control signal to a drive circuit 56. Based on the motor control signal, the discharge pressure P of the electric pump 22 is controlled.

The flowrate command value QA is input also into a selector control portion 57. Based on the flowrate command value QA, the selector control portion 57 selects the operation mode of the selector valve 23 from among an operation mode in which the hydraulic fluid is supplied to the first hydraulic chamber 43 and an operation mode in which the hydraulic fluid is supplied to the second hydraulic chamber 44. Thus, the hydraulic fluid in a predetermined amount is supplied to the hydraulic chamber that corresponds to the selected operation mode of the selector valve 23.

In the hydraulic power steering system 1 according to the present example embodiment, there is executed a steering control for suppressing an abrupt change in the steering angle θ when the steering wheel 11 is turned back toward the neutral steering position. In this steering control, whether the steering wheel 11 is being turned back toward the neutral steering position is determined. If it is determined that the steering wheel 11 is being turned back toward the neutral steering position, the electric pump 22 and the selector valve 23 are controlled so as to reduce the speed at which the piston 42 moves in such a direction that the steering wheel 11 is turned back toward the neutral steering position.

More specifically, the ECU 31 determines whether the steering wheel 11 is being turned back toward the neutral steering position, based on a relation between an actual steering angular velocity SVR, which is calculated by differentiating the steering angle θ detected by the steering angle sensor 33, and the present assist force command value TA.

If it is determined that the steering wheel 11 is being turned back toward the neutral steering position, the operation mode of the selector valve 23 is controlled such that a drain of the hydraulic fluid from the hydraulic chamber of which the capacity decreases, from among the first and second hydraulic chambers 43 and 44, is suppressed.

A target steering velocity SVA is calculated based on the steering torque τ, steering angle θ, and vehicle speed V at this time. Then, the value of current at the motor 45, that is, the discharge pressure P of the electric pump 22 is controlled such that the actual steering angular velocity SVR equals the target steering velocity SVA. In this way, the flowrate of hydraulic fluid discharged toward the electric pump 22 from the hydraulic chamber of which the capacity decreases is adjusted.

The hydraulic power steering system 1 according to the first example embodiment executes parking assist control as vehicle drive assist control. In the parking assist control, when the vehicle is parked, an automatic steering operation is executed based on the information from a monitor mounted in the vehicle, to bring the vehicle into a parking spot set in advance. In the parking assist control, first, a torque command value τa used for parking the vehicle is calculated based on the positional relation between a target parking spot set beforehand by an ECU (not shown in the drawings) in the vehicle and the present vehicle position determined based on the information from the monitor. The torque command value τa is input into the ECU 31 (the assist force calculation portion 51), and then the assist force calculation portion 51 calculates the assist force command value TA, which is required to move the vehicle into the target parking spot from the present position, based on the torque command value τa, the vehicle speed V, and the steering torque τ. Subsequently, the discharge pressure P of the electric pump 22 and the operation mode of the selector valve 23 are controlled in accordance with the assist force command value TA thus set, in the manner described above.

Next, the structure and operation of the selector valve 23 will be described with reference to FIG. 3. The operation mode of the selector valve 23 is switched among first to third modes each establishing a specific hydraulic passage communication mode. In the first mode, as shown in FIG. 3A, communication is provided between the first fluid passage 25 and the fourth fluid passage 28, and communication is provided between the second fluid passage 26 and the third fluid passage 27. In the second mode, as shown in FIG. 3B, communication is provided between the first fluid passage 25 and the second fluid passage 26, and communication is provided between the third fluid passage 27 and the fourth fluid passage 28. In the third mode, as shown in FIG. 3C, communication is provided between the first fluid passage 25 and the third fluid passage 27, and communication is provided between the second fluid passage 26 and the fourth fluid passage 28. The selector valve 23 is placed in the first mode in a situation where the steering wheel 11 is not operated, for example, when the vehicle is traveling straight and when the vehicle is not traveling. The selector valve 23 is placed in the second mode when the vehicle turns right, and placed in the third mode when the vehicle turns left.

Next, the hydraulic fluid flow in each passage communication mode will be described. In the first mode, the hydraulic fluid discharged from the electric pump 22 to the selector valve 23 via the first fluid passage 25 is drained to the reservoir tank 24 via the fourth fluid passage 28. Further, because communication is provided between the second fluid passage 26 and the third fluid passage 27, there is no difference between the hydraulic pressure in the first hydraulic chamber 43 and that in the second hydraulic chamber 44. Thus, the steering operation assist force is "zero".

In the second mode, the hydraulic fluid discharged from the electric pump 22 to the selector valve 23 via the first fluid passage 25 is supplied to the first hydraulic chamber 43 via the second fluid passage 26. In accordance with this, the hydraulic fluid in the second hydraulic chamber 44 is drained to the reservoir tank 24 via the third fluid passage 27, the selector valve 23, and the fourth fluid passage 28. This causes the piston 42 to move leftward in FIG. 3B as indicated by an open arrow drawn by a solid line in FIG. 3B. As such, the capacity of the first hydraulic chamber 43 increases, while the capacity of the second hydraulic chamber 44 decreases.

In the third mode, the hydraulic fluid discharged from the electric pump 22 to the selector valve 23 via the first fluid passage 25 is supplied to the second hydraulic chamber 44 via the third fluid passage 27. In accordance with this, the hydraulic fluid in the first hydraulic chamber 43 is drained to the reservoir tank 24 via the second fluid passage 26, the selector valve 23, and the fourth fluid passage. This causes the piston 42 to move rightward in FIG. 3C as indicated by an open arrow drawn by a solid line in FIG. 3C. As such, the capacity of the second hydraulic chamber 44 increases, while the capacity of the first hydraulic chamber 43 decreases.

Figure 3A:
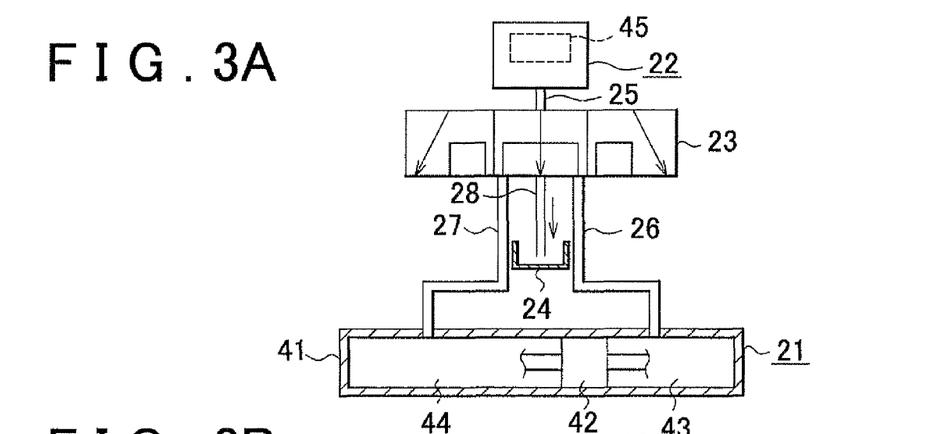
FIGS. 3A to 3C are sectional views showing the structures of a selector valve and a hydraulic cylinder of the hydraulic power steering system according to the first example embodiment.
Figure 3B:
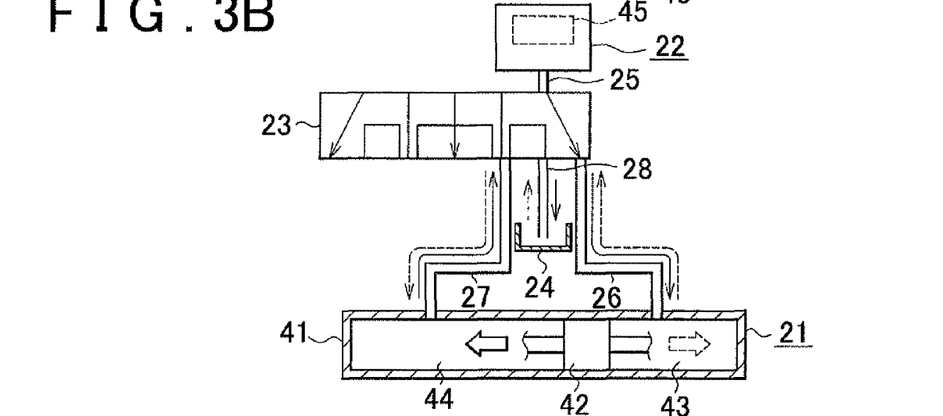

In a state where the selector valve 23 is in the second mode and the steering wheel 11 is being turned back toward the neutral steering position, the piston 42 moves rightward in FIG. 3B in response to the steering wheel 11 being turned back toward the neutral steering position, as indicated by an open arrow drawn by a broken line in FIG. 3B. Therefore, the capacity of the first hydraulic chamber 43 decreases, which causes the hydraulic fluid to be supplied from the first hydraulic chamber 43 to the electric pump 22 via the second fluid passage 26, the selector valve 23, and the first fluid passage 25. Meanwhile, the capacity of the second hydraulic chamber 44 increases, which causes the hydraulic fluid to be supplied from the reservoir tank 24 to the second hydraulic chamber 44 via the fourth fluid passage 28, the selector valve 23, and the third fluid passage 27.

If the steering control describe above is executed in the situation described above, the selector valve 23 is maintained in the second mode, and the hydraulic fluid supplied to the electric pump 22 from the selector valve 23 forces the impeller of the electric pump 22 to rotate in the reverse direction that is a direction opposite to the direction in which the impeller is urged to rotate by the motor 45. Meanwhile, the motor 45 is driven at a predetermined current value (output level) under the steering control. The rotational torque of the motor 45, in this state, serves as a resistance to the rotation of the impeller in the reverse direction. Therefore, it is harder to rotate the impeller in the reverse direction than when the motor 45 is not driven. As a result, as compared to the case where the motor 45 is not driven, the flowrate of the hydraulic fluid discharged from the first hydraulic chamber 43 to the selector valve 23 is lower. Therefore, the rate of decrease in the capacity of the first hydraulic chamber 43 becomes lower, and the piston 42 moves at a lower speed. Further, by adjusting the opening degree of a port of the selector valve 23, which communicates with the first hydraulic chamber 43, the flowrate of the hydraulic fluid that enters the selector valve 23 from the first hydraulic chamber 43 via the port is adjusted. Thus, the moving speed of the piston 42 is adjusted. Note that, because the operations performed in a situation where the selector valve 23 in the third mode and the steering wheel 11 is being turned back toward the neutral steering position are simply opposite to and thus substantially the same as those described above, as indicated by an open arrow drawn by a solid line and an open arrow drawn by a broken line in FIG. 3C, descriptions thereof are omitted.

The following are the effects obtained in the first example embodiment.

1) In the first example embodiment, the manner in which the hydraulic fluid is supplied to and drained from the hydraulic cylinder 21 is set as the assist force command value TA, and the amount of hydraulic fluid discharged from the electric pump 22 and the operation mode of the selector valve 23 are controlled based on the assist force command value TA. Thus, the assist force produced by the hydraulic cylinder 21 is changed so as to conform to the operation state of the vehicle at each moment. Therefore, the assist force produced by the hydraulic cylinder is controlled more flexibly than in conventional hydraulic power steering systems wherein the manner in which the hydraulic fluid is supplied to and drained from the hydraulic cylinder is determined based simply on the driver's steering operation.

2) In the first example embodiment, the manner in which the hydraulic fluid is supplied to and drained from the hydraulic cylinder 21 is set through the control of the selector valve 23 even when the driver is not operating the steering wheel 11. Therefore, it is possible to execute parking assist control, such as the one described above.

3) In the first example embodiment, since the operation mode of the selector valve 23 is controlled such that the electric pump 22 is in communication with the hydraulic chamber of which the capacity decreases when the steering wheel 11 is turned back toward the neutral steering position, the amount of the hydraulic fluid discharged from this hydraulic chamber is relatively small. Therefore, it is possible to suppress an abrupt change in the steering angle θ, which may be caused when the steering wheel 11 is being turned back toward the neutral steering position.

Next, a second example embodiment of the invention will be described with reference to FIGS. 4 to 7. In the following, only the differences from the first example embodiment will be described in detail, and like structural elements will be denoted by like reference numerals, and their descriptions will be omitted. In the second example embodiment, the structure for controlling the electric pump 22, the structure of the selector valve, and the modes of respective hydraulic passage communications with the hydraulic cylinder 21 are different from those in the first example embodiment.

Figure 4:
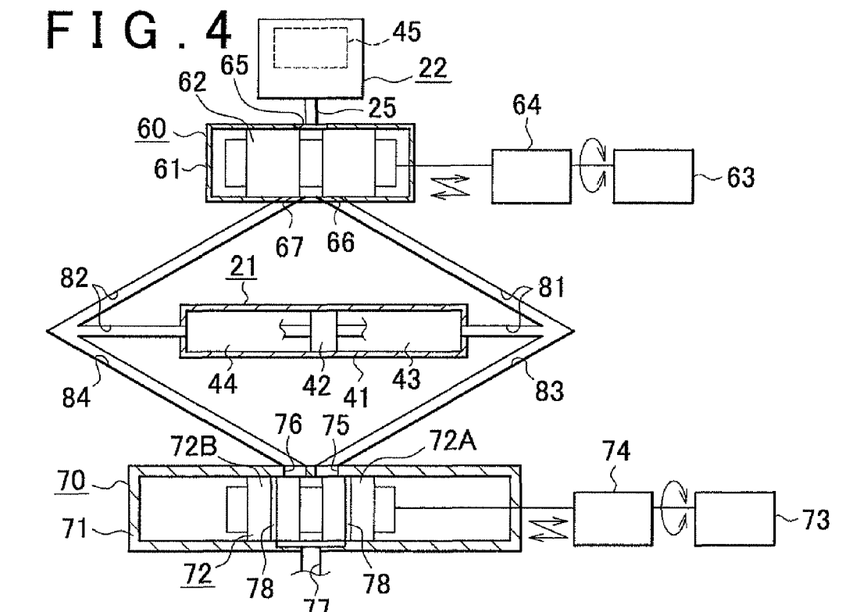
FIG. 4 is a sectional view showing the structures of a selector valve, a hydraulic cylinder, and a drain valve of a hydraulic power steering system according to a second example embodiment of the invention.

As shown in FIG. 4, the hydraulic power steering system 1 has a drain valve 70 from which the hydraulic fluid in the hydraulic cylinder 21 is drained, in addition to a selector valve 60. The hydraulic cylinder 21, the selector valve 60, and the drain valve 70 are interconnected via a first connection fluid passage 81, a second connection fluid passage 82, a third connection fluid passage 83, and a fourth connection fluid passage 84. The selector valve 60 and the first hydraulic chamber 43 are connected to each other via the first connection fluid passage 81. The selector valve 60 and the second hydraulic chamber 44 are connected to each other via the second connection fluid passage 82. The first connection fluid passage 81 and the drain valve 70 are connected to each other via the third connection fluid passage 83. The second connection fluid passage 82 and the drain valve 70 are connected to each other via the fourth connection fluid passage 84.

Disposed in a boxy housing 61 of the selector valve 60 is a valve member 62 that reciprocates in the longitudinal direction of the housing 61. Provided outside the housing 61 are a motor 63 and a conversion mechanism 64 that converts the rotation of the motor 63 into a linear motion and is coupled with the valve member 62. The conversion mechanism 64 is constituted of a shaft and an attachment member. The shaft is coupled with an output shaft of the motor 63 and has an external thread. The attachment member has a threaded bore into which the external thread of the shaft is screwed and is attached to the valve member 62. With this structure, the valve member 62 reciprocates as the motor 63 rotates.

Further, the housing 61 has a supply port 65 connected to the first fluid passage 25, a first port 66 connected to the first connection fluid passage 81 (the first hydraulic chamber 43), and a second port 67 connected to the second connection fluid passage 82 (the second hydraulic chamber 44).

By reciprocating the valve member 62, the operation mode of the selector valve 60 is switched between a first mode and a second mode, each effecting a specific (different) mode of communications among the respective ports 65, 66, and 67, as follows. In the first mode, communication is provided between the supply port 65 and the first port 66 (the first hydraulic chamber 43), while communication between the supply port 65 and the second port 67 (the second hydraulic chamber 44) is blocked. In the second mode, communication is provided between the supply port 65 and the second port 67 (the second hydraulic chamber 44), while communication between the supply port 65 and the first port 66 (the first hydraulic chamber 43) is blocked.

Disposed in a boxy housing 71 of the drain valve 70 is a valve member 72 that reciprocates in the longitudinal direction of the housing 71. Provided outside the housing 71 are a motor 73 and a conversion mechanism 74 that converts the rotation of the motor 73 into a linear motion and is coupled with the valve member 72. It is to be noted that the structure of the conversion mechanism 74 is substantially the same as that of the conversion mechanism 64 of the selector valve 60 and therefore description thereof is be omitted.

Further, the housing 71 has a first port 75 connected to the third connection fluid passage 83 (the first hydraulic chamber 43), a second port 76 connected to the fourth connection fluid passage 84 (the second hydraulic chamber 44), and a drain port 77 from which the hydraulic fluid in the drain valve 70 is drained.

The valve member 72 has a first valve element 72A for opening or closing the first port 75, and a second valve element 72B for opening or closing the second port 76. An annular groove 78 is formed at the longitudinal center of the outer peripheral face (outer face) of each valve element 72A and 72B. Thus, even when the valve member 72 is in such a position as to close the first port 75, the first port 75 and the drain port 77 are still in communication with each other via the annular groove 78 formed in the first valve element 72A, and even when the valve member 72 is in such a position as to close the second port 76, the second port 76 and the drain port 77 are still in communication with each other via the annular groove 78 formed in the second valve element 72B.

By reciprocating the valve member 72, the operation mode of the drain valve 70 is switched between a first mode and a second mode, described below. In the first mode, the first port 75 is open because the first valve element 72A is off from the first port 75, while the second port 76 is closed by the second valve element 72B. In the second mode, the second port 76 is open because the second valve element 72B is off from the second port 76, while the first port 75 is closed by the first valve element 72A.

The width (i.e., the length as measured in the longitudinal direction of the valve member 72) and depth of each annular groove 78, that is, the flow passage area of each annular groove 78 is set such that the flowrate at which the hydraulic fluid flows through the annular groove 78 is lower than the flowrate at which the hydraulic fluid is drained via the first port 75 and the drain port 77 in the first mode of the drain valve 70 and the flowrate at which the hydraulic fluid is drained via the second port 76 and the drain port 77 in the second mode of the drain valve 70.

Figure 5:
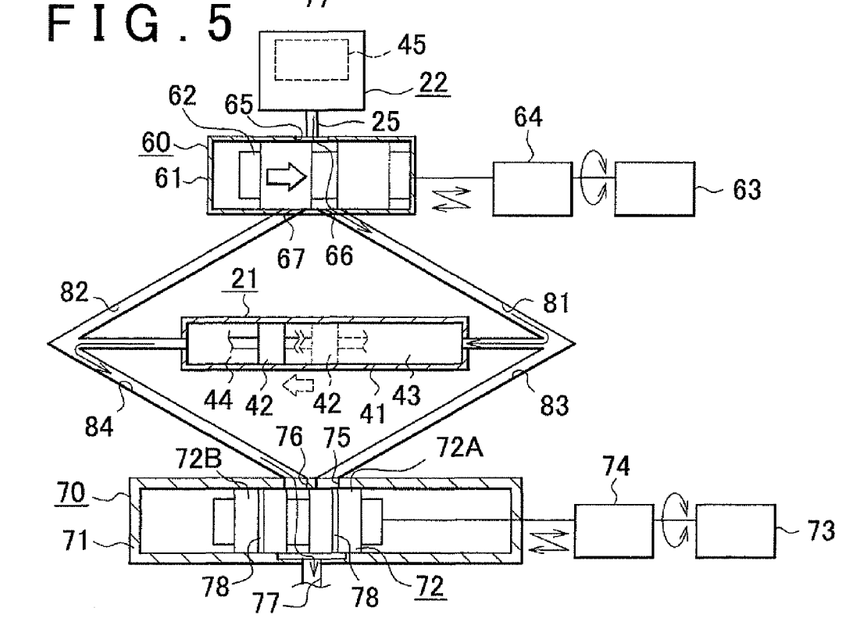
FIG. 5 is a sectional view showing the structures of the selector valve, the hydraulic cylinder, and the drain valve according to the second example embodiment.

The above-described operation modes of the selector valve 60 and drain valve 70 are controlled in the following combinations in accordance with the steering operation. When the vehicle turns left, as shown in FIG. 5, the selector valve 60 is placed in the first mode while the drain valve 70 is placed in the second mode (this state will hereinafter be referred to as "first combination mode"). When the vehicle turns right, as shown in FIG. 6, the selector valve 60 is placed in the second mode while the drain valve 70 is placed in the first mode (this state will hereinafter be referred to as "second combination mode").

Next, the hydraulic fluid flow in each combination mode will be described. In the first combination mode, as shown in FIG. 5, the hydraulic fluid supplied from the electric pump 22 to the selector valve 60 via the first fluid passage 25 is supplied to the first hydraulic chamber 43 via the first connection fluid passage 81. In accordance with this, the hydraulic fluid in the second hydraulic chamber 44 is discharged to the drain valve 70 via the fourth connection fluid passage 84 and then drained to the reservoir tank 24 via the drain port 77.

Figure 6:
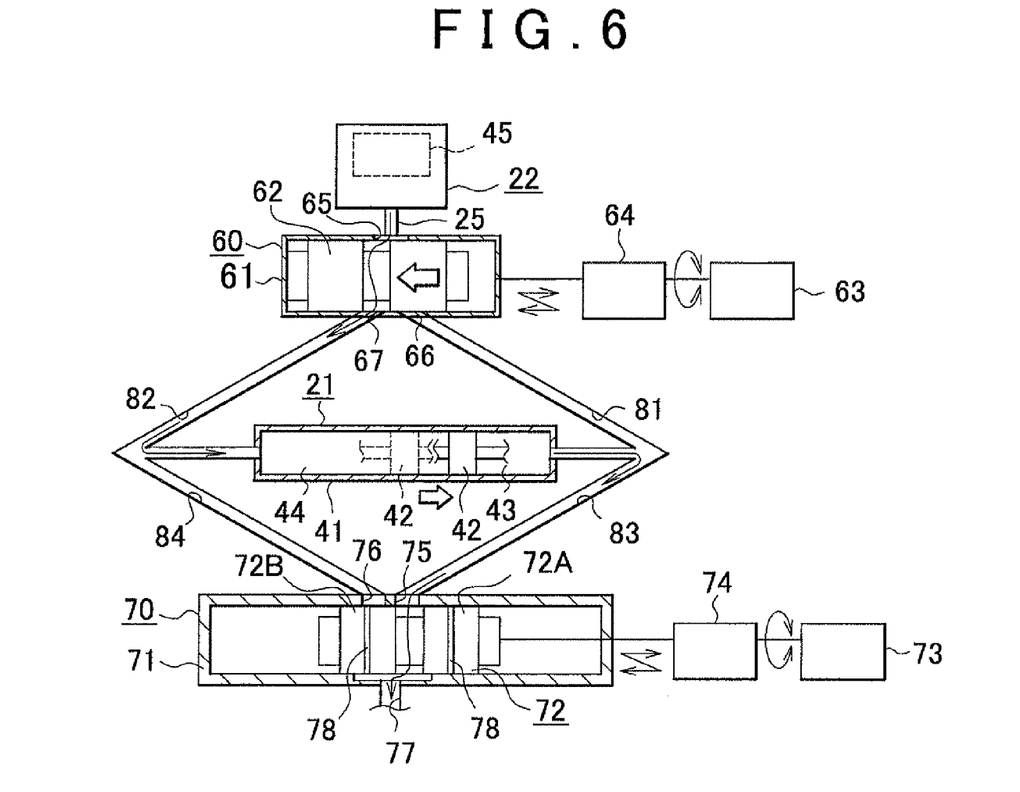
FIG. 6 is a sectional view showing the structures of the selector valve, the hydraulic cylinder, and the drain valve according to the second example embodiment.

In contrast, in the second combination mode, as shown in FIG. 6, the hydraulic fluid supplied from the electric pump 22 to the selector valve 60 via the first fluid passage 25 is supplied to the second hydraulic chamber 44 via the second connection fluid passage 82. In accordance with this, the hydraulic fluid in the first hydraulic chamber 43 is discharged to the drain valve 70 via the third connection fluid passage 83 and then drained to the reservoir tank 24 via the drain port 77.

As shown in FIG. 5, when the steering wheel 11 is turned back toward the neutral steering position in the first combination mode, that is, when the piston 42 is moved in the direction indicated by an open arrow drawn by a broken line in FIG. 5, the combination mode is switched, in response to that returning steering operation, from the first combination mode to the second combination mode, which takes a given period of time. In this time period, the hydraulic fluid discharged from the first hydraulic chamber 43 with a decrease in the capacity of the first hydraulic chamber 43 is sent to the drain port 77 of the drain valve 70 via the third connection fluid passage 83 and the annular groove 78 formed in the valve element 72A. Thus, even in this time period, the piston 42 is allowed to move. Note that the state established when the steering wheel 11 is turned back toward the neutral steering position in the second combination mode is simply opposite to and thus substantially the same as that described above, and therefore description thereof is omitted.

Next, the control on the electric pump 22, the selector valve 60, and the drain valve 70 will be described with reference to FIG. 7. The flowrate command value QA calculated by the flowrate control portion 52 is input into a motor speed control portion 91 that controls the speed of the motor 45 of the electric pump 22. The actual rotation angle SR detected by the rotation angle detection portion 55 that detects the rotation angle of the motor 45 and an actual motor speed VR detected by a motor speed detection portion 92 that detects the speed of the motor 45 are input into the motor speed control portion 91. The motor speed control portion 91 generates a motor control signal based on the flowrate command value QA and through motor speed feedback control on the actual rotation angle SR and the actual motor speed VR, and then outputs the generated motor control signal to the drive circuit 56. Thus, a discharge flowrate Q of the electric pump 22 is controlled.

The flowrate command value QA is also input into the selector control portion 57 and a drain valve control portion 93. The selector control portion 57 selects the operation mode of the selector valve 60 from among the first mode and the second mode based on the flowrate command value QA. The drain valve control portion 93 selects the operation mode of the drain valve 70 from among the first mode or the second mode based on the flowrate command value QA.

According to the second example embodiment, it is possible to obtain the following effects in addition to the effects 1) and 2) in the first example embodiment.

4) In the second example embodiment, the annular grooves 78 are formed in the valve member 72 of the drain valve 70 such that the first port 75 and the drain port 77 are in communication with each other via one of the annular grooves 78 when the drain valve 70 is in the first mode and such that the second port 76 and the drain port 77 are in communication with each other via the other of the annular grooves 78 when the drain valve 70 is in the second mode. In the second example embodiment, further, the width (i.e., the length as measured in the longitudinal direction of the valve member 72) and depth of each annular groove 78, that is, the flow passage area of each annular groove 78 is set such that the flowrate at which the hydraulic fluid flows through the annular groove 78 is lower than the flowrate at which the hydraulic fluid is drained via the first port 75 and the drain port 77 in the first mode of the drain valve 70 and the flowrate at which the hydraulic fluid is drained via the second port 76 and the drain port 77 in the second mode of the drain valve 70. Owing to these structural features, the flowrate at which the hydraulic fluid is drained via the annular groove 78 when the operation mode of the selector valve 60 is switched between the first mode and the second mode is relatively low. Further, when the steering wheel 11 is being turned back toward the neutral steering position, a delay in discharging the hydraulic fluid from the first hydraulic chamber 43 or the second hydraulic chamber 44, which may retard the turning-back operation of the steering wheel 11 is suppressed. As a result, the steering wheel 11 is turned back quickly.

The structures of hydraulic power steering system according to the inventions are not limited to those in the foregoing example embodiments. For example, the foregoing examples may be modified as follows. It is to be understood that the example modifications presented below may be applied not only to the above-described embodiments, and the example modifications may be implemented in combination.

Figure 7:
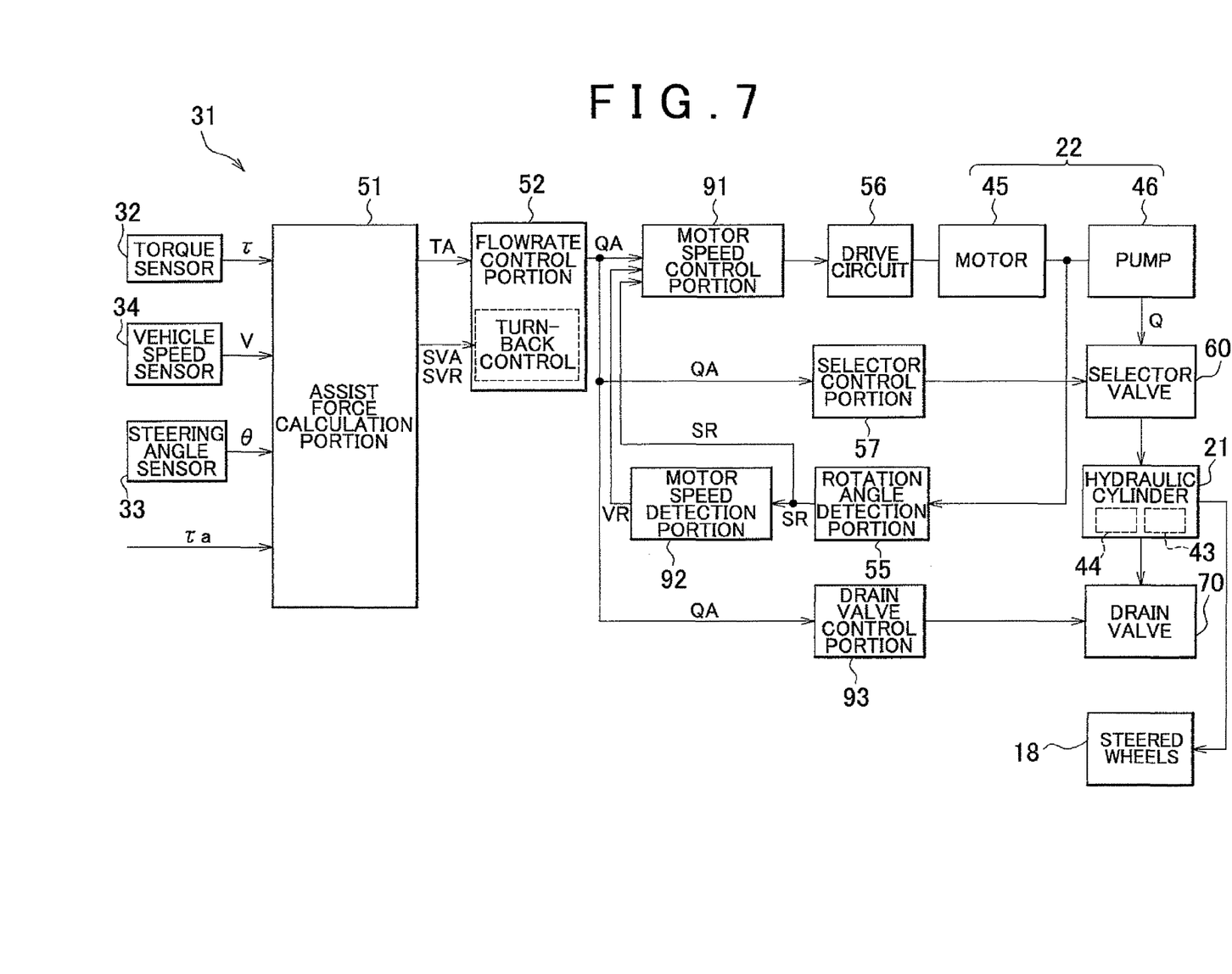
FIG. 7 is a block diagram showing the configuration of a control according to the second example embodiment.

As shown in FIG. 7, the first example embodiment may be modified such that the discharge flowrate Q of the electric pump 22 is controlled by calculating the flowrate command value QA from the assist force command value TA, then generating a motor control signal based on the flowrate command value QA and through motor speed feedback control on the actual rotation angle SR and the actual motor speed VR, and then outputting the generated motor control signal to the drive circuit 56.

Figure 2:
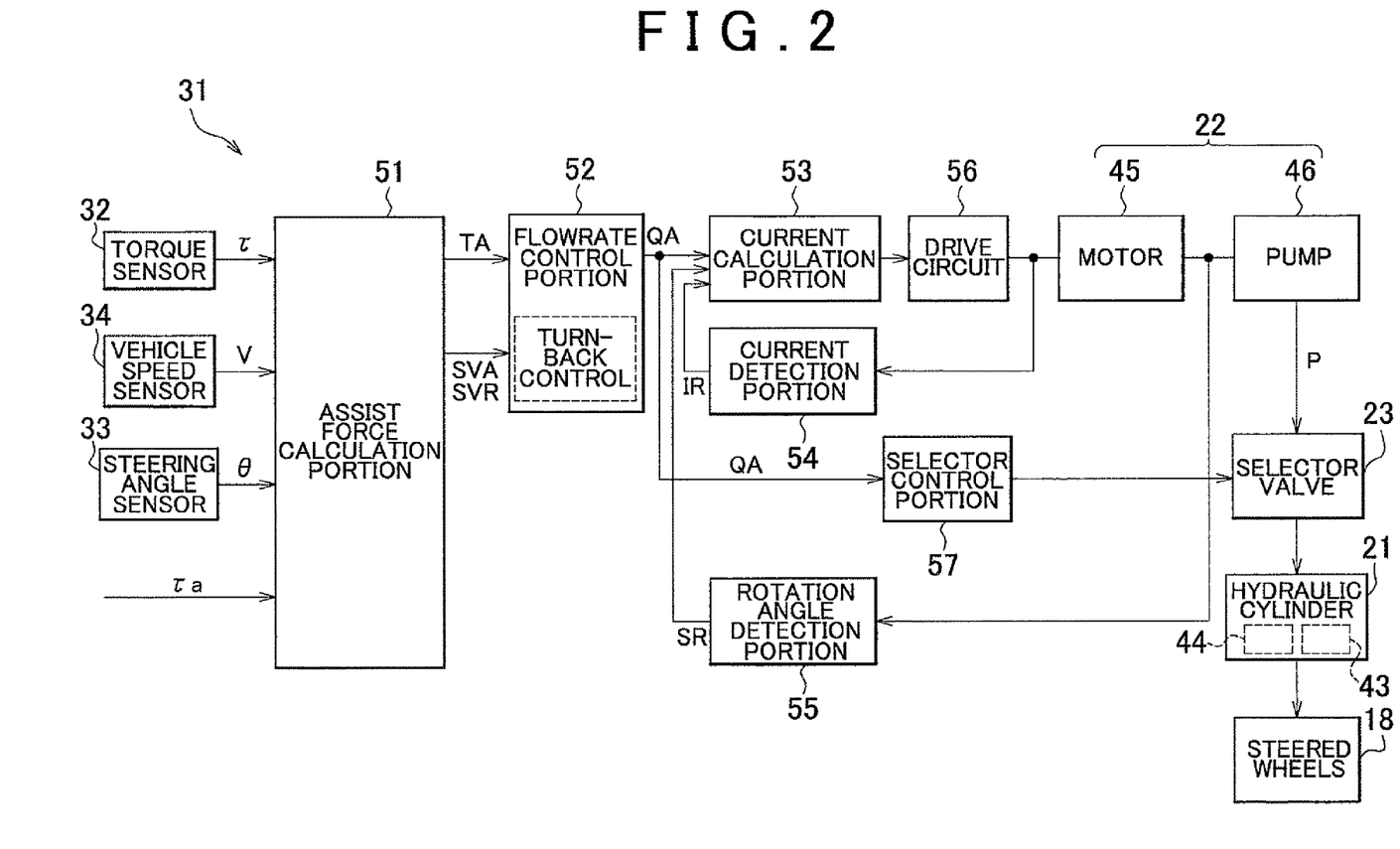
FIG. 2 is a block diagram showing the configuration of a control according to the first example embodiment.
Figure 3C:
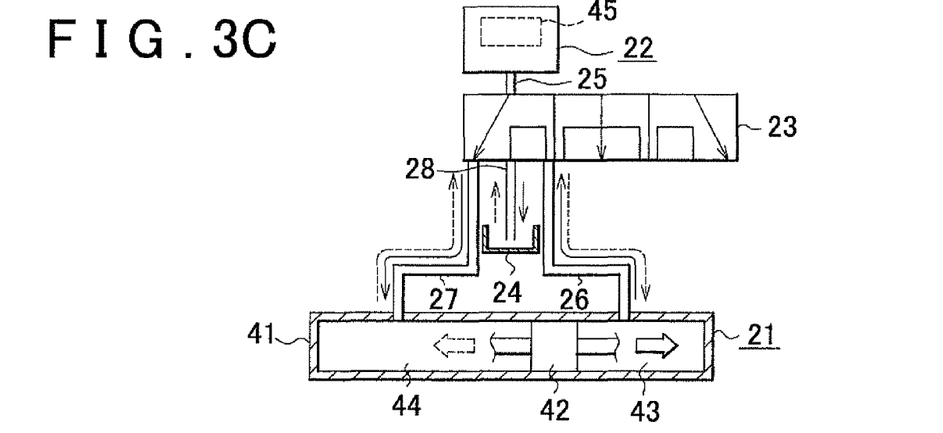

As shown in FIG. 2, the second example embodiment may be modified such that the discharge pressure P of the electric pump 22 is controlled by calculating the flowrate command value QA from the assist force command value TA, then generating a motor control signal based on the flowrate command value QA and through current feedback control on the actual current IR and the actual rotation angle SR, and then outputting the generated motor control signal to the drive circuit 56.

Figure 8A:
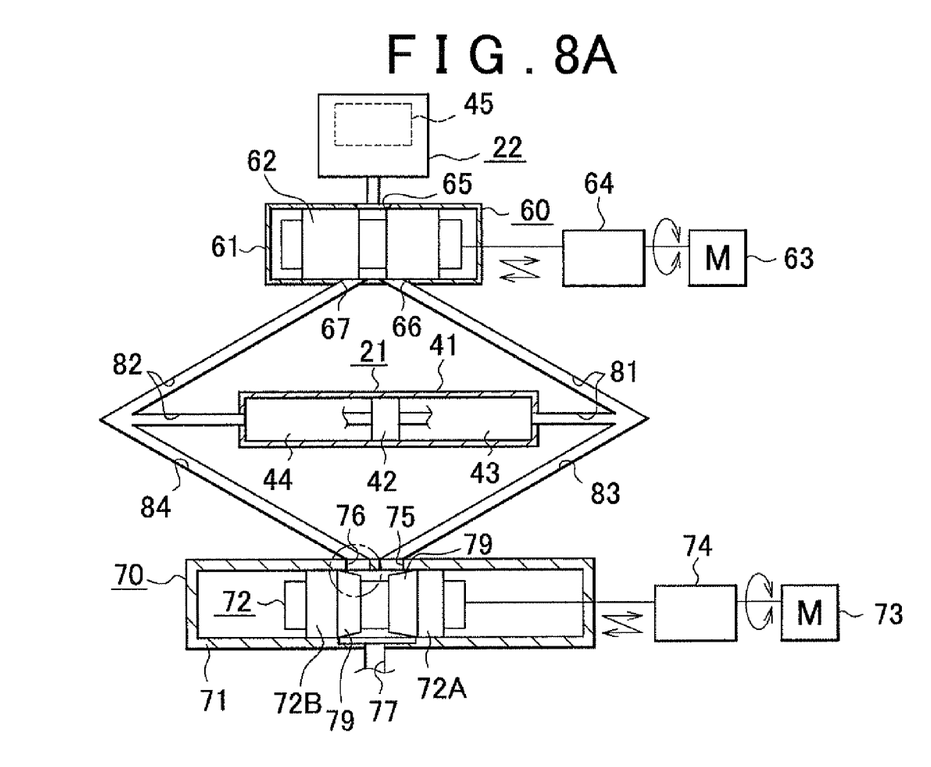
FIG. 8A is a sectional view showing the structures of the selector valve, the hydraulic cylinder, and the drain valve.
Figure 8B:
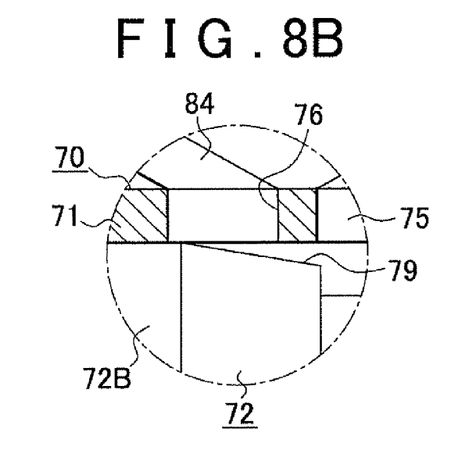
FIGS. 8B and 8C are enlarged views of a portion indicated by a circle drawn by a single dot line in FIG. 8A.
Figure 8C:
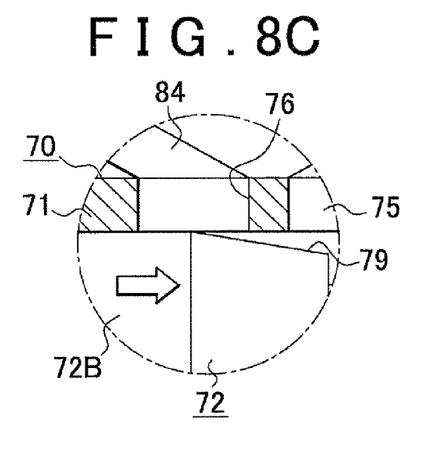

In the drain valve 70 in the second example embodiment, as shown in FIG. 8A, tapered portions 79 may be formed, respectively, at the left end of the first valve element 72A and the right end of the second valve element 72B, instead of forming the annular grooves 78. In this case, the opening degree of the second port 76 is changed by reciprocating the valve member 72 as shown in FIGS. 5B and 5C, and the opening degree of the first port 75 is changed by moving the valve member 72 in the same manner. Thus, when the steering wheel 11 is turned back toward the neutral steering position, the amount of the hydraulic fluid discharged to the drain valve 70 from the corresponding hydraulic chamber is adjusted. As a result, the steering wheel 11 is turned back smoothly.

The assist force command value TA is calculated based on the steering torque τ, the steering angle θ, and the vehicle speed V in the foregoing example embodiments. Alternatively, the assist force command value TA may be calculated based on the steering torque τ and the steering angle θ, or based on the steering torque τ and the vehicle speed V. Further alternatively, the assist force command value TA may be calculated based on only one of the steering torque τ, the steering angle θ, and the vehicle speed V.

In the foregoing example embodiments, the hydraulic power steering system 1 may include two separate ECUs one of which controls the electric pump 22 and the other of which controls the selector valve 23. In this case, the ECUs are interconnected via CAN (Control Area Network).

In the foregoing example embodiments, in addition to the parking assist control, lane-keeping control may be executed as the drive assist control. The lane-keeping control prevents the vehicle, when the vehicle is traveling, from straying from the present travel lane by automatically steering the vehicle based on information obtained from a monitor installed in the vehicle and serving as a lane detection device that detects the travel lane on the road. In the lane-keeping control, a torque command value for preventing the vehicle from straying from the present travel lane is calculated in accordance with the vehicle position relative to the present travel lane, which is determined based on the information from the monitor. Then, the assist force command value TA is calculated based on the torque command value, the vehicle speed V, and the steering torque τ. Then, based on the assist force command value TA thus calculated, the discharge flowrate Q of the electric pump 22, switching of the hydraulic chamber, to which the hydraulic fluid is supplied from the selector valve 23, between the hydraulic chambers 43 and 44, and the amount of hydraulic fluid that is supplied to the selected hydraulic chamber are controlled. This structure provides an effect similar to the effect 2) in the first example embodiment.

With the hydraulic power steering system according to the invention, it is possible to highly flexibly control the assist force produced by a hydraulic cylinder.

What is claimed is:

1. A hydraulic power steering system comprising:
    a hydraulic cylinder in which an interior is partitioned into a first hydraulic chamber and a second hydraulic chamber by a piston provided on a steered shaft; and
    an electric pump that supplies a hydraulic fluid to the hydraulic cylinder, and the hydraulic power steering system assisting a steering operation for steering a vehicle by moving the steered shaft together with the piston using a force produced due to a difference between a hydraulic pressure in the first hydraulic chamber and a hydraulic pressure in the second hydraulic chamber;
    a selector valve that is selectively set in an operation mode in which the hydraulic fluid is supplied to the first hydraulic chamber while the hydraulic fluid is drained from the second hydraulic chamber or in an operation mode in which the hydraulic fluid is supplied to the second hydraulic chamber while the hydraulic fluid is drained from the first hydraulic chamber;
    a detector that detects an operation state of the vehicle; and
    a controller that sets, based on the operation state detected by the detector, a fluid supply-drain mode in which the hydraulic fluid is supplied to and drained from the hydraulic cylinder, and controls the operation mode of the selector valve and an amount of hydraulic fluid that is supplied from the electric pump based on the set fluid supply-drain mode,
    wherein the controller controls, when a steering wheel is turned back toward a neutral steering position, the operation mode of the selector valve such that a drain of the hydraulic fluid from the hydraulic chamber of which a capacity decreases, from among the first and second hydraulic chambers, is suppressed.

2. The hydraulic power steering system according to claim 1, wherein the detector detects, as the operation state of the vehicle, at least one of a steering torque, a steering angle, and a vehicle speed.

3. The hydraulic power steering system according to claim 2, wherein the controller obtains information on a positional relation between a target parking spot and a present position of the vehicle, and controls, based on the obtained information and the detected operation state of the vehicle, the selector valve and the electric pump so as to bring the vehicle into the target parking spot.

4. The hydraulic power steering system according to claim 3, wherein the controller obtains information on a position of the vehicle relative to a travel lane on a road surface, and controls, based on the obtained information and the detected operation state of the vehicle, the selector valve and the electric pump so as to keep the vehicle in the travel lane.

5. The hydraulic power steering system according to claim 3, further comprising:
    a drain valve that adjusts an amount of hydraulic fluid discharged from the first hydraulic chamber and an amount of the hydraulic fluid discharged from the second hydraulic chamber,
    wherein the selector valve includes: a housing that has a supply port from which the hydraulic fluid is supplied, a first port connected to the first hydraulic chamber, and a second port connected to the second hydraulic chamber; a valve member that is disposed in the housing so as to be allowed to reciprocate in the housing and that is used to switch a mode of communications among the supply port, the first port, and the second port, between a first mode in which the supply port and the first port are in communication with each other and a second mode in which the supply port and the second port are in communication with each other; and a drive mechanism causes a reciprocation motion of the valve member,
    wherein the drain valve includes: a housing that has a first port to which the hydraulic fluid discharged from the first hydraulic chamber is supplied, a second port to which the hydraulic fluid discharged from the second hydraulic chamber is supplied, and a drain port from which the hydraulic fluid is drained; a valve member that is disposed in the housing so as to be allowed to reciprocate in the housing and that is used to switch a mode of communications among the first port, the second port, and the drain port, between a first mode in which the first port and the drain port are in communication with each other and a second mode in which the second port and the drain port are in communication with each other; and a drive mechanism that causes a reciprocating motion of the valve member, and
    wherein the controller selectively establishes a mode combination state where the selector valve is in the first mode and the drain valve is in the second mode or a mode combination state where the selector valve is in the second mode and the drain valve is in the first mode, by adjusting a travel amount of the valve member of the selector valve using the drive mechanism of the selector valve and a travel amount of the valve member of the drain valve using the drive mechanism of the drain valve, based on the set fluid supply-drain manner.

6. The hydraulic power steering system according to claim 2, wherein the controller obtains information on a position of the vehicle relative to a travel lane on a road surface, and controls, based on the obtained information and the detected operation state of the vehicle, the selector valve and the electric pump so as to keep the vehicle in the travel lane.

7. The hydraulic power steering system according to claim 2, further comprising:
    a drain valve that adjusts an amount of hydraulic fluid discharged from the first hydraulic chamber and an amount of the hydraulic fluid discharged from the second hydraulic chamber,
    wherein the selector valve includes: a housing that has a supply port from which the hydraulic fluid is supplied, a first port connected to the first hydraulic chamber, and a second port connected to the second hydraulic chamber; a valve member that is disposed in the housing so as to be allowed to reciprocate in the housing and that is used to switch a mode of communications among the supply port, the first port, and the second port, between a first mode in which the supply port and the first port are in communication with each other and a second mode in which the supply port and the second port are in communication with each other; and a drive mechanism causes a reciprocation motion of the valve member, wherein the drain valve includes: a housing that has a first port to which the hydraulic fluid discharged from the first hydraulic chamber is supplied, a second port to which the hydraulic fluid discharged from the second hydraulic chamber is supplied, and a drain port from which the hydraulic fluid is drained; a valve member that is disposed in the housing so as to be allowed to reciprocate in the housing and that is used to switch a mode of communications among the first port, the second port, and the drain port, between a first mode in which the first port and the drain port are in communication with each other and a second mode in which the second port and the drain port are in communication with each other; and a drive mechanism that causes a reciprocating motion of the valve member, and wherein the controller selectively establishes a mode combination state where the selector valve is in the first mode and the drain valve is in the second mode or a mode combination state where the selector valve is in the second mode and the drain valve is in the first mode, by adjusting a travel amount of the valve member of the selector valve using the drive mechanism of the selector valve and a travel amount of the valve member of the drain valve using the drive mechanism of the drain valve, based on the set fluid supply-drain manner.

8. The hydraulic power steering system according to claim 6, further comprising:

a drain valve that adjusts an amount of hydraulic fluid discharged from the first hydraulic chamber and an amount of the hydraulic fluid discharged from the second hydraulic chamber, wherein the selector valve includes: a housing that has a supply port from which the hydraulic fluid is supplied, a first port connected to the first hydraulic chamber, and a second port connected to the second hydraulic chamber; a valve member that is disposed in the housing so as to be allowed to reciprocate in the housing and that is used to switch a mode of communications among the supply port, the first port, and the second port, between a first mode in which the supply port and the first port are in communication with each other and a second mode in which the supply port and the second port are in communication with each other; and a drive mechanism causes a reciprocation motion of the valve member, wherein the drain valve includes: a housing that has a first port to which the hydraulic fluid discharged from the first hydraulic chamber is supplied, a second port to which the hydraulic fluid discharged from the second hydraulic chamber is supplied, and a drain port from which the hydraulic fluid is drained; a valve member that is disposed in the housing so as to be allowed to reciprocate in the housing and that is used to switch a mode of communications among the first port, the second port, and the drain port, between a first mode in which the first port and the drain port are in communication with each other and a second mode in which the second port and the drain port are in communication with each other; and a drive mechanism that causes a reciprocating motion of the valve member, and wherein the controller selectively establishes a mode combination state where the selector valve is in the first mode and the drain valve is in the second mode or a mode combination state where the selector valve is in the second mode and the drain valve is in the first mode, by adjusting a travel amount of the valve member of the selector valve using the drive mechanism of the selector valve and a travel amount of the valve member of the drain valve using the drive mechanism of the drain valve, based on the set fluid supply-drain manner.

9. The hydraulic power steering system according to claim 1, further comprising:

a drain valve that adjusts an amount of hydraulic fluid discharged from the first hydraulic chamber and an amount of the hydraulic fluid discharged from the second hydraulic chamber, wherein the selector valve includes: a housing that has a supply port from which the hydraulic fluid is supplied, a first port connected to the first hydraulic chamber, and a second port connected to the second hydraulic chamber; a valve member that is disposed in the housing so as to be allowed to reciprocate in the housing and that is used to switch a mode of communications among the supply port, the first port, and the second port, between a first mode in which the supply port and the first port are in communication with each other and a second mode in which the supply port and the second port are in communication with each other; and a drive mechanism causes a reciprocation motion of the valve member, wherein the drain valve includes: a housing that has a first port to which the hydraulic fluid discharged from the first hydraulic chamber is supplied, a second port to which the hydraulic fluid discharged from the second hydraulic chamber is supplied, and a drain port from which the hydraulic fluid is drained; a valve member that is disposed in the housing so as to be allowed to reciprocate in the housing and that is used to switch a mode of communications among the first port, the second port, and the drain port, between a first mode in which the first port and the drain port are in communication with each other and a second mode in which the second port and the drain port are in communication with each other; and a drive mechanism that causes a reciprocating motion of the valve member, and wherein the controller selectively establishes a mode combination state where the selector valve is in the first mode and the drain valve is in the second mode or a mode combination state where the selector valve is in the second mode and the drain valve is in the first mode, by adjusting a travel amount of the valve member of the selector valve using the drive mechanism of the selector valve and a travel amount of the valve member of the drain valve using the drive mechanism of the drain valve, based on the set fluid supply-drain manner.

10. The hydraulic power steering system according to claim 9, wherein the valve member of the drain valve has a communication portion via which the first port and the drain port are in communication with each other when the mode of communications among the first port, the second port, and the drain port is the second mode and another communication portion via which the second port and the drain port are in communication with each other when the mode of communications among the first port, the second port, and the drain port is the first mode, and a flow passage area of each of the commutation portions is set such that a flowrate at which the hydraulic fluid flows through the communication portion is lower than a flowrate at which the hydraulic fluid is drained via the first port and the drain port when the mode of communications among the first port, the second port, and the drain port is the first mode and a flowrate at which the hydraulic fluid is drained via the second port and the drain port when the mode of communications among the first port, the second port, and the drain port is the second mode.

11. The hydraulic power steering system according to claim 10, wherein the communication portions are annular grooves formed in an outer face of the valve member.

12. The hydraulic power steering system according to claim 10, wherein the communication portions are tapered portions that are formed in the valve member of the drain valve and that change, respectively, a flow passage area of the first port and a flow passage area of the second port based on a position of the valve element, to adjust an amount of the hydraulic fluid that is discharged from one of the first hydraulic chamber and the second hydraulic chamber when the steering wheel is turned back toward the neutral steering position.

* * * * *